(12) United States Patent
Luick

(10) Patent No.: US 6,901,504 B2
(45) Date of Patent: May 31, 2005

(54) RESULT FORWARDING OF EITHER INPUT OPERAND TO SAME OPERAND INPUT TO REDUCE FORWARDING PATH

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 10/054,070

(22) Filed: Jan. 22, 2002

(65) Prior Publication Data

US 2003/0140217 A1 Jul. 24, 2003

(51) Int. Cl.[7] .................................................. G06F 9/38
(52) U.S. Cl. ..................................... 712/218; 712/216
(58) Field of Search .................................. 712/216, 218

(56) References Cited

U.S. PATENT DOCUMENTS

| 5,764,943 | A | * | 6/1998 | Wechsler .................... 712/218 |
| 6,145,097 | A | * | 11/2000 | Moyer et al. ................. 714/30 |
| 6,388,672 | B1 | * | 5/2002 | Ide et al. .................... 345/544 |
| 6,430,679 | B1 | * | 8/2002 | Heeb .......................... 712/218 |

\* cited by examiner

*Primary Examiner*—Kenneth S. Kim
(74) *Attorney, Agent, or Firm*—Moser, Patterson & Sheridan, LLP

(57) ABSTRACT

Embodiments are provided in which result forwarding for each execution unit in a processor is implemented for only one operand input of the execution unit. If another non-implemented operand input of the execution unit needs forwarded results, the forwarded results are passed through the implemented operand input. Non-forwarded operands are passed through the non-implemented operand input.

18 Claims, 5 Drawing Sheets

RESULT FORWARDING OF EITHER INPUT OPERAND TO SAME OPERAND INPUT TO REDUCE FORWARDING PATH

BACKGROUND OF THE INVENTION

1. Field of the Invention

The present invention generally relates to result forwarding, and more particularly to result forwarding in high-speed processors.

2. Description of the Related Art

In a conventional processor, the result of an execution unit (e.g., an arithmetic logic unit or ALU) or a load instruction is often written into a common register file. If a next instruction needs the result as an operand, the result is read from the common register file.

In a conventional, high performance processor, it is often beneficial to immediately use the result of an execution unit or a load instruction as a source operand for the next instruction if need be without waiting for the result to be first written into a common register file. This is called result forwarding or result bypassing. Result forwarding can substantially increase the performance of a processor.

However, to implement result forwarding, the output of each execution unit in a processor must be connected to the execution unit's own inputs and to the inputs of every other execution unit of the processor. Moreover, some instructions require up to three source operands, namely, RA, RB, and RC. As a result, each execution unit of the processor must have three operand inputs for receiving up to three operands RA, RB, and RC. The particular operand input to the execution unit is selected by a selector, which receives the output of each execution unit. Each execution unit has three selectors, one for each operand. According, if the processor has six execution units, there must be (3 operand sources)×(6 units)=18 different forward data paths coming to each execution unit (via the respective selectors). Each forward data path requires a set of physical wires. If a second forward cycle is needed, there must be double the number of forward data paths required above, that is, (18 forward data paths)×2=36 different forward data paths coming to each execution unit. Further, the load and store pipes may be deeper than the ALU pipe, requiring more forward data paths to each execution unit. In other words, while only two ALU instructions (i.e., instructions that require the use of an ALU) may be executed simultaneously, three or more load/store instructions may be executed simultaneously and each of the load/store instructions requires a separate forward data path to the inputs of the execution units. This requires more forward data paths to each execution unit. It is very difficult to build 40 or more 64-bit forward data paths. Moreover, huge buses are required, and not all of them can be made local to be fast. Also, forwarding control logic must be controlled by control signals generated from register address comparators. These register address comparators must compare all result register numbers from two or three previous cycles to all possible source register numbers for the current cycle. The comparisons increase design complexity and greatly slow down the forwarding control logic.

Accordingly, there is a need for a method and apparatus in which result forwarding is implemented with less forward data paths coming to execution units of a processor.

SUMMARY OF THE INVENTION

In one embodiment, a method for forwarding results of a first instruction to operand inputs of an execution unit is described. The method comprises forwarding the results of the first instruction to a first operand input of the execution unit and not to a second operand input of the execution unit.

In another embodiment, a digital circuit comprises an execution unit including first and second operand inputs. The first operand input is configured to receive forwarded results of a first instruction and the second operand input is configured not to receive the forwarded results of the first instruction.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments are provided in which result forwarding for each execution unit in a processor is implemented for only one operand input of the execution unit. If another non-implemented operand input of the execution unit needs forwarded results, the forwarded results are passed through the implemented operand input. Non-forwarded operands are passed through the non-implemented operand input.

Figure 1:
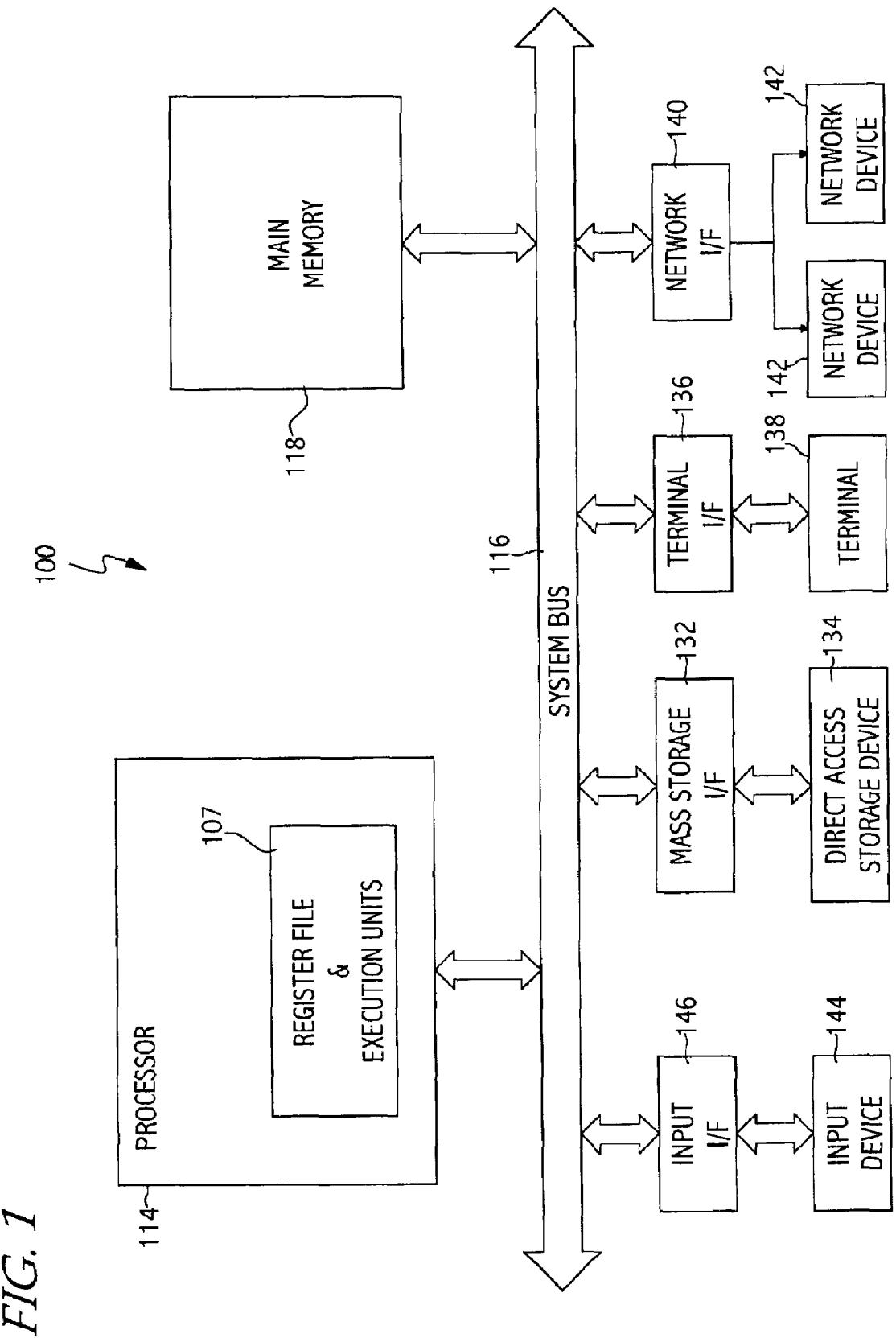
FIG. 1 is a computer system 100 according to an embodiment.

FIG. 1 shows a computer system 100 according to an embodiment. Illustratively, the computer system 100 includes a system bus 116, at least one processor 114 coupled to the system bus 116. The processor 114 includes a digital circuit 107 comprising a register file and execution units. The computer system 100 also includes an input device 144 coupled to system bus 116 via an input interface 146, a storage device 134 coupled to system bus 116 via a mass storage interface 132, a terminal 138 coupled to system bus 116 via a terminal interface 136, and a plurality of networked devices 142 coupled to system bus 116 via a network interface 140.

Terminal 138 is any display device such as a cathode ray tube (CRT) or a plasma screen. Terminal 138 and networked devices 142 may be desktop or PC-based computers, workstations, network terminals, or other networked computer systems. Input device 144 can be any device to give input to the computer system 100. For example, a keyboard, keypad, light pen, touch screen, button, mouse, track ball, or speech recognition unit could be used. Further, although shown separately from the input device, the terminal 138 and input device 144 could be combined. For example, a display screen with an integrated touch screen, a display with an integrated keyboard or a speech recognition unit combined with a text speech converter could be used.

Storage device 134 is DASD (Direct Access Storage Device), although it could be any other storage such as floppy disc drives or optical storage. Although storage 134 is shown as a single unit, it could be any combination of fixed and/or removable storage devices, such as fixed disc drives, floppy disc drives, tape drives, removable memory cards, or optical storage. Main memory 118 and storage device 134 could be part of one virtual address space spanning multiple primary and secondary storage devices.

The contents of main memory 118 can be loaded from and stored to the storage device 134 as processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed registers and caches to lower speed but larger DRAM chips.

Figure 2:
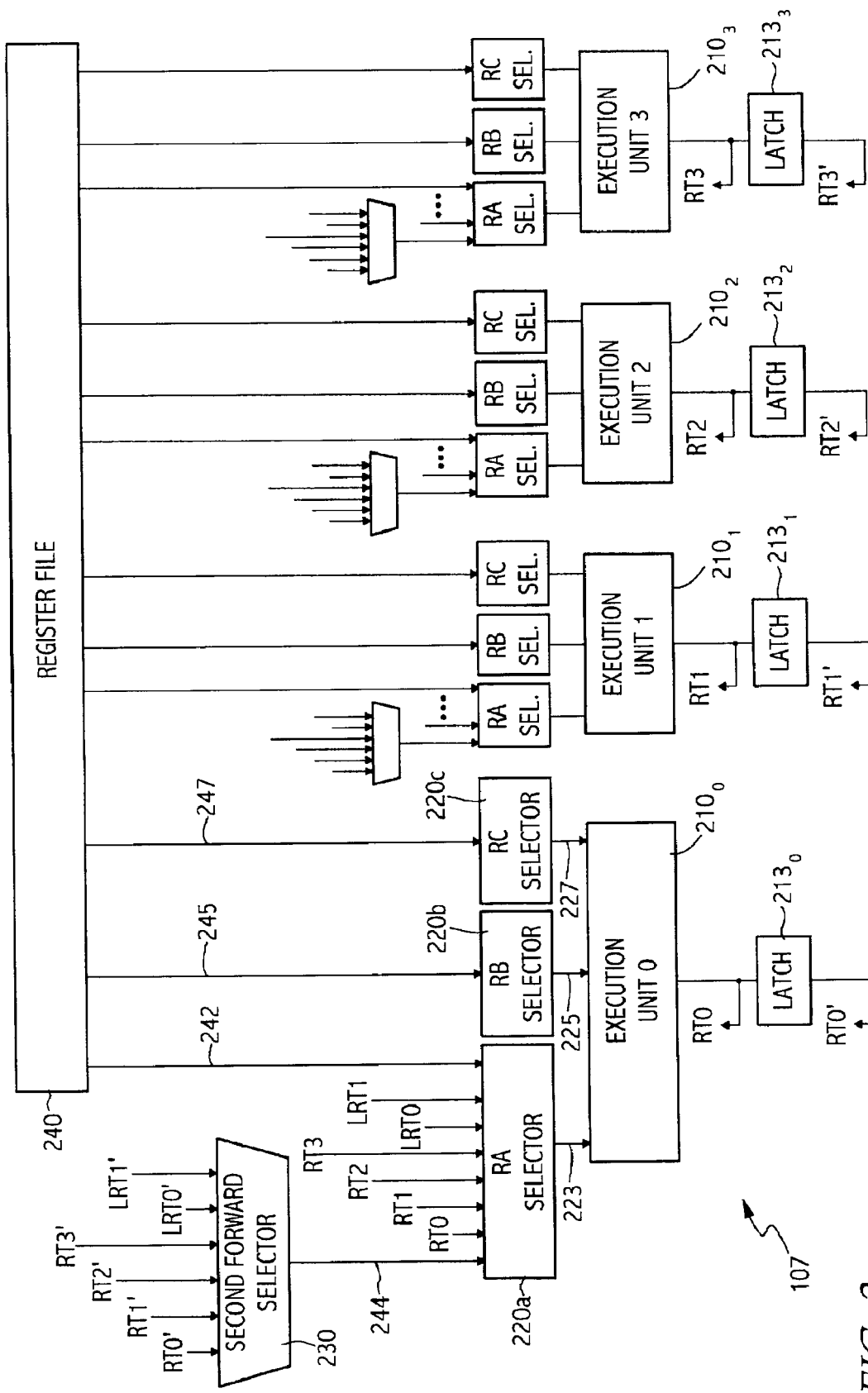
FIG. 2 shows one embodiment of the register file and execution units 107 of FIG. 1.

FIG. 2 shows one embodiment of the digital circuit 107 of FIG. 1. The digital circuit 107 includes, illustratively, four execution units $210_0$, $210_1$, $210_2$, and $210_3$, and a register file 240. The execution units $210_0$, $210_1$, $210_2$, and $210_3$ output first forward cycle signals RT0, RT1, RT2, and RT3, respectively. In addition, the execution units $210_0$, $210_1$, $210_2$, and $210_3$ are coupled to latches $213_0$, $213_1$, $213_2$, and $213_3$, respectively. The latches $213_0$, $213_1$, $213_2$, and $213_3$ hold second forward cycle signals RT0', RT1', RT2', and RT3' of the execution units $210_0$, $210_1$, $210_2$, and $210_3$, respectively. For purposes of simplicity, only the details of the execution unit $210_0$ will be described. However, it is understood that the execution units $210_1$, $210_2$, and $210_3$ have connections similar to those of the execution unit $210_0$. The execution unit $210_0$ has, illustratively, three operand inputs for receiving three operands from an RA Selector 220a, an RB Selector 220b, and an RC Selector 220c via connection lines 223, 225, and 227, respectively. A connection line may comprise a plurality of wires. The RB Selector 220b and the RC Selector 220c couple the register file 240 to the execution unit $210_0$. The RA Selector 220a receives as inputs an output 244 of a Second Forward Selector 230, a plurality of first forward cycle signals RT0, RT1, RT2, RT3, LRT0, and LRT1, and an output 242 of the register file 240. The signals RT0, RT1, RT2, and RT3 of the execution units $210_0$, $210_1$, $210_2$, and $210_3$, respectively, are applied as inputs to the RA Selector 220a. The first forward cycle signals LRT0 and LRT1 are data from first and second data cache, corresponding to first and second load/store instructions, respectively. The RA Selector 220a selects and passes one of its inputs to the execution unit $210_0$ via connection line 223. The Second Forward Selector 230 receives as inputs a plurality of second forward cycle signals RT0', RT1', RT2', RT3', LRT0', and LRT1'. The second forward cycle signals RT0', RT1', RT2', RT3', LRT0', and LRT1' are the second forward cycle signals of the first forward cycle signals RT0, RT1, RT2, RT3, LRT0, and LRT1, respectively.

The RB Selector 220b and the RC Selector 220c each receives as inputs only signals from the register file 240 via connection lines 245 and 247, respectively. As a result, the number of forward data paths coming to the RA Selector 220a, RB Selector 220b, and RC Selector 220c of the execution unit $210_0$ is kept low. The execution unit 210 generates an output RT0 to a latch $213_0$ and to the RA Selectors 220 of the execution units 210. The execution units $210_1$, $210_2$, and $210_3$ have connections similar to those of the execution unit $210_0$. As a result, the total number of forward data paths in the processor is kept low.

To illustrate the operations of the digital circuit 107 of FIG. 2, assume a first instruction causes the execution unit $210_0$ to add contents of a first register and a second register of the register file 240 and store a first result in a third register. The RA Selector 220a selects the output 242 of the register file 240 so that the content of the first register passes to the execution unit $210_0$ via connection line 223. The RB Selector 220b passes the content of the second register of the register file 240 to the execution unit $210_0$ via connection line 225. The execution unit $210_0$ adds the contents of the first and second registers and generates the first result as the signal RT0. The signal RT0 is applied as an input to the RA Selector 220a. The first result is also stored in the latch 213o. As a result, the latch $213_0$ holds a copy of the first result called RT0'. The signal RT0' is applied as an input to the second Forward Selector 230.

Assume further that a second instruction immediately following the first instruction causes the execution unit $210_0$ to add contents of the third register and a fourth register and store a second result in a fifth register. The latest content of the third register is the first result which is available at the inputs of the RA Selector 220a as the signal RT0. As a result, the RA Selector 220a selects and passes signal RT0 to the execution unit $210_0$ via connection line 223. The RB Selector 220b passes the content of the fourth register of the register file 240 to the execution unit $210_0$ via connection lines 245 and 225. The execution unit $210_0$ adds the signal RT0, which is the latest value of the third register, and the content of the fourth register and generates the second result as the signal RT0. The latch $213_0$ still holds the first result.

Assume further that a third instruction immediately following the second instruction causes the execution unit $210_0$ to add contents of the third register and a sixth register and store a third result in a seventh register. The latest content of the third register is the first result which is available at the inputs of the second Forward Selector 230 as the signal RT0'. As a result, the second Forward Selector 230 selects and passes the signal RT0' to the RA Selector 220a via connection line 244. The RA Selector 220a selects and passes the signal RT0' to the execution unit $210_0$ via connection line 223. The RB Selector 220b passes the content of the sixth register of the register file 240 to the execution unit $210_0$ via connection lines 245 and 225. The execution unit $210_0$ adds the first result, which is the latest value of the third register, and the content of the sixth register and generates the third result.

In summary, the first and second results are immediately fed as inputs to the execution unit $210_0$ via RA Selector 220a instead of being first written to the register file 240 and then read back from the register file 240 to the execution unit $210_0$ via connection line 242. As a result, data processing is faster.

Figure 3:
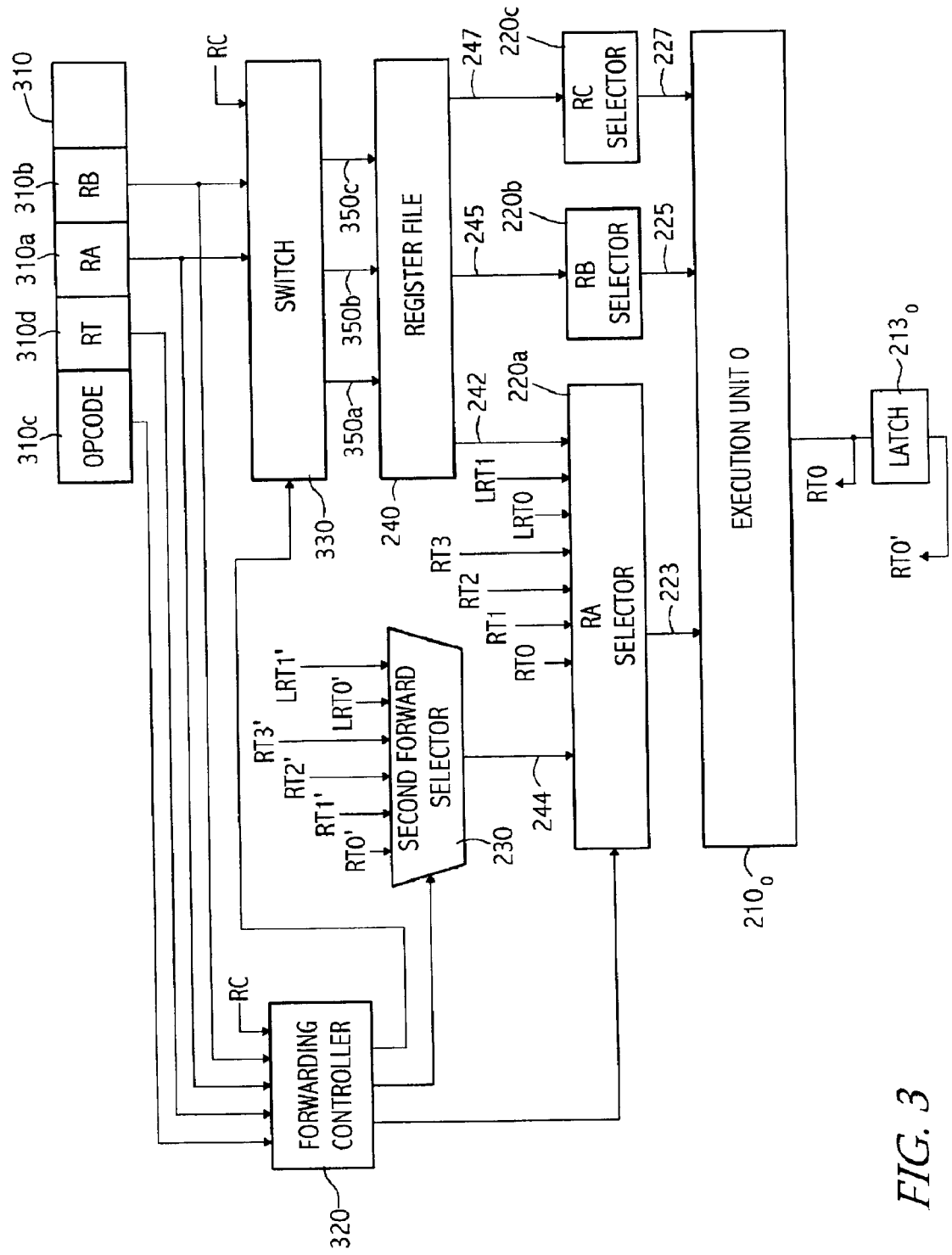
FIG. 3 shows one embodiment for implementing result forwarding for results coming to the execution unit $210_0$.

FIG. 3 shows another embodiment for implementing result forwarding for results coming to the execution unit $210_0$. For illustration, assume a fourth instruction is being executed causing the execution unit $210_0$ to add contents of an eighth register and a ninth register of the register file 240 and store a fourth result in a tenth register. The fourth instruction is loaded into an instruction register 310. The fourth instruction has an opcode field 310c, an RT field 310d, an RA field 310a, and an RB field 310b. The RA field 310a contains a source register code RA of the eighth register which specifies the eighth register as an operand source. The RB field 310b contains a source register code RB of the ninth register which specifies the ninth register as another operand source. The opcode field 310c contains an add instruction opcode which specifies the operation of adding the contents of the eighth and ninth registers. The RT field 310d contains the target register code RT of the tenth register which specifies the tenth register as a target register which will receive the fourth result.

The instruction register 310 is coupled to a switch 330 which receives as inputs the source register codes RA and RB of the fourth instruction contained in the instruction register 310. The switch 330 also receives as input a source register code RC specifying an eleventh register of the register file 240 as yet another operand source. The switch 330 passes the source register codes RA, RB, and RC to the register file 240 via connection lines 350a, 350b, and 350c, not necessarily respectively. The contents of the three registers specified by the three source register codes passed on the connection lines 350a, 350b, and 350c are applied to the RA Selector 220a, RB Selector 220b, and RC Selector 220c via connection lines 242, 245, and 247, respectively. The fourth instruction needs only two operand sources: the eight and ninth registers. Therefore, the RC Selector 220c is disabled, and the execution unit $210_0$ receives operands from only the RA Selector 220a and RB Selector 220b via connection lines 223 & 225, respectively.

The instruction register 310 is also coupled to a forwarding controller 320 which receives as inputs and stores the opcode of the current instruction in the instruction register 310. The forwarding controller 320 also receives as inputs and stores the source register codes RA, RB, and RC, and the target register code RT of the current instruction in the instruction register 310. The forwarding controller 320 generates as outputs control signals to the switch 330 causing the switch 330 to pass the source register codes RA, RB, and RC to the register file 240 via connection lines 350a, 350b, and 350c, not necessarily respectively. Illustratively, the forwarding controller 320 compares the source register codes RA, RB, and RC of the current instruction in the instruction register 310 with the target register codes RT of the two preceding instructions to determine whether result forwarding is needed. In the case of the fourth instruction, the forwarding controller 320 compares the source register codes RA, RB, and RC of the fourth instruction with the target register codes RT of the second and third instructions to determine whether result forwarding is needed. Because the second and third instructions use the fifth and seventh registers as their target registers, respectively, and the fourth instruction does not use the fifth or seventh register as an operand source, no result forwarding is applicable. As a result, the forwarding controller 320 causes the switch 330 to pass the source register codes RA, RB, and RC of the fourth instruction to the register file 240 via connection lines 350a, 350b, and 350c, respectively. The contents of the eight and ninth registers are applied from the register file 240 to the RA Selector 220a and RB Selector 220b via connection lines 242 and 245, respectively.

The forwarding controller 320 also generates control signals to the RA Selector 220a causing the RA Selector 220a to pass only the content of the eighth register at the output 242 of the register file 240 to the execution unit $210_0$.

The RB Selector 220b passes the content of the ninth register from the connection line 245 to the execution unit $210_0$ via connection line 225. The execution unit $210_0$ then adds the contents of the eight and ninth registers to generate the fourth result as the signal RT0.

Assume that a fifth instruction immediately following the fourth instruction is being executed causing the execution unit $210_0$ to add contents of a twelfth register and the tenth register of the register file 240 and store a fifth result in a thirteenth register. The fifth instruction is loaded into the instruction register 310. Similar to the fourth instruction, the fifth instruction has an opcode field 310c, an RT field 310d, an RA field 310a, and an RB field 310b. The RA field 310a contains a source register code RA of the twelfth register which specifies the twelfth register as an operand source. The RB field 310b contains a source register code RB of the tenth register which specifies the tenth register as another operand source. The opcode field 310c contains an add instruction opcode which specifies the operation of adding the contents of the twelfth and tenth registers. The RT field 310d contains the target register code RT of the thirteenth register which specifies the thirteenth register as a target register which will receive the fifth result.

The forwarding controller 320 compares the source register codes RA, RB, and RC of the fifth instruction with the target register codes RT of the third and fourth instructions to determine whether result forwarding is needed. Because the fourth instruction has the tenth register as a target register and the fifth instruction also has the tenth register as a source register, result forwarding is applicable. In other words, the fourth result at the output RT0 of the execution unit $210_0$ needs to be forwarded as an operand to the input of the execution unit $210_0$. The forwarding controller 320 causes the switch 330 to pass the source register code RA specifying the twelfth register to the register file 240 via connection line 350b, not connection line 350a as in the case of the fourth instruction. As a result, the content of the twelfth register passes to the execution unit $210_0$ via connection line 245, the RB Selector 220b, and connection line 225. The forwarding controller 320 also causes the switch 330 to pass the source register code RB specifying the tenth register to the register file 240 via connection line 350a, not connection line 350b. The forwarding controller 320 also generates control signals to the RA Selector 220a causing the RA Selector 220a to pass only the fourth result as the input signal RT0 of the RA Selector 220a to the execution unit $210_0$. The execution unit $210_0$ then adds the contents of the tenth and twelfth registers to generate the fifth result.

To illustrate further the function of the forwarding controller 320 and the switch 330, assume the RA and RB fields of the fifth instruction specified the tenth and twelfth registers, respectively, instead of the twelfth and tenth registers, respectively, as described above. As a result, the forwarding controller 320 would cause the switch 330 to pass the source register codes RA and RB to the register file 240 via connection lines 350a and 350b, respectively (instead of via connection lines 350b and 350a, respectively, as described above).

Figure 4:
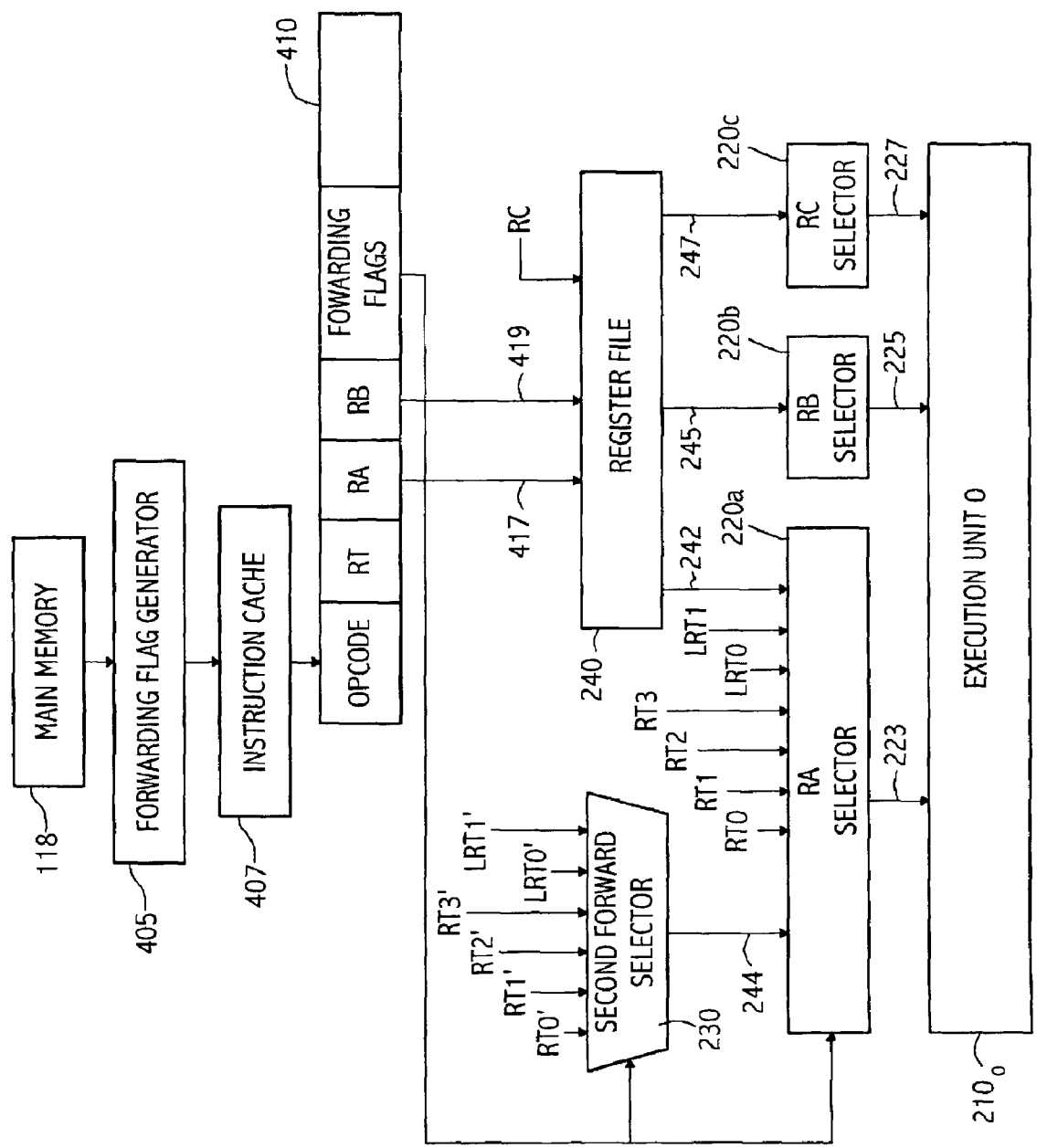
FIG. 4 shows another embodiment for implementing result forwarding for results coming to the execution unit $210_0$.

FIG. 4 shows another embodiment for implementing result forwarding for results coming to the execution unit $210_0$. Instructions are loaded from the memory 118 into a Forwarding Flag Generator 405. The Forwarding Flag Generator 405 compares the instructions to determine if result forwarding is possible and generates forwarding flags for controlling result forwarding. If result forwarding for an instruction is possible, the Forwarding Flag Generator 405 may also have to modify the contents of the RA field and RB field of the instruction so that the result of a preceding instruction can be forwarded through the RA Selector 220*a*. The instructions with their respective forwarding flags are sent from the Forwarding Flag Generator 405 to an instruction cache 407. When an instruction is executed, the instruction with its respective forwarding flags is loaded from the instruction cache 407 into an instruction register 410.

For illustration, assume the fourth and fifth instructions discussed above are to be executed in the embodiment of FIG. 4. When the fourth and fifth instructions are loaded from the memory 118 into the Forwarding Flag Generator 405, the Forwarding Flag Generator 405 compares the fourth and fifth instructions to determine if result forwarding is possible. Because the target register code RT of the fourth instruction is identical to the source register code RB of the fifth instruction (both specify the tenth register), forwarding flags are generated for the fifth instruction reflecting this forwarding dependency. The Forwarding Flag Generator 405 also swaps the contents of the RA field and RB field of the fifth instruction so that the RA field now specifies the tenth register and the RB field specifies the twelfth register. Then the modified fifth instruction with its respective forwarding flags is loaded from the Forwarding Flag Generator 405 to the instruction cache 407. When the fifth instruction is executed, the fifth instruction with its respective forwarding flags is loaded from the instruction cache 407 to the instruction register 410.

The contents of the RA field and RB field of the fifth instruction are sent to the register file 240 via connection lines 417 and 419, respectively. The contents of the two registers specified by the two register codes passed on the connection lines 417 & 419 are applied to RA Selector 220*a* and RB Selector 220*b* via connection lines 242 & 245, respectively. As a result, the content of the twelfth register is passed from the register file 240 through connection line 245 and RB Selector 220*b* to the execution unit 210$_0$. The forwarding flags corresponding to the fifth instruction are applied to the second Forward Selector 230 and RA Selector 220*a* causing the RA Selector 220*a* to select input signal RT0 and pass it to the execution unit 210$_0$ via connection line 223. The input signal RT0 to the RA Selector 220*a* is the fourth result which is the latest value of the tenth register. The execution unit 210$_0$ adds the contents of the tenth and twelfth registers and generates the fifth result.

If the Forwarding Flag Generator 405 had not swapped the contents of the RA and RB fields of the fifth instruction, the content of the twelfth register would have been passed from the register file 240 to the RA Selector 220*a*, instead of the RB Selector 220*b*. However, the fourth result which is the latest value of the tenth register is also applied to the inputs of the RA Selector. As a result, it would have been impossible to provide the execution unit 210$_0$ both the required operands of the fifth instruction, i.e., the RT0 signal and the content of the twelfth register on connection line 242. Because the forwarding flags are generated during reloading of the instructions to the instruction cache 407, as soon as an instruction is loaded into the instruction register 410, all control signals needed for result forwarding are available.

Figure 5:
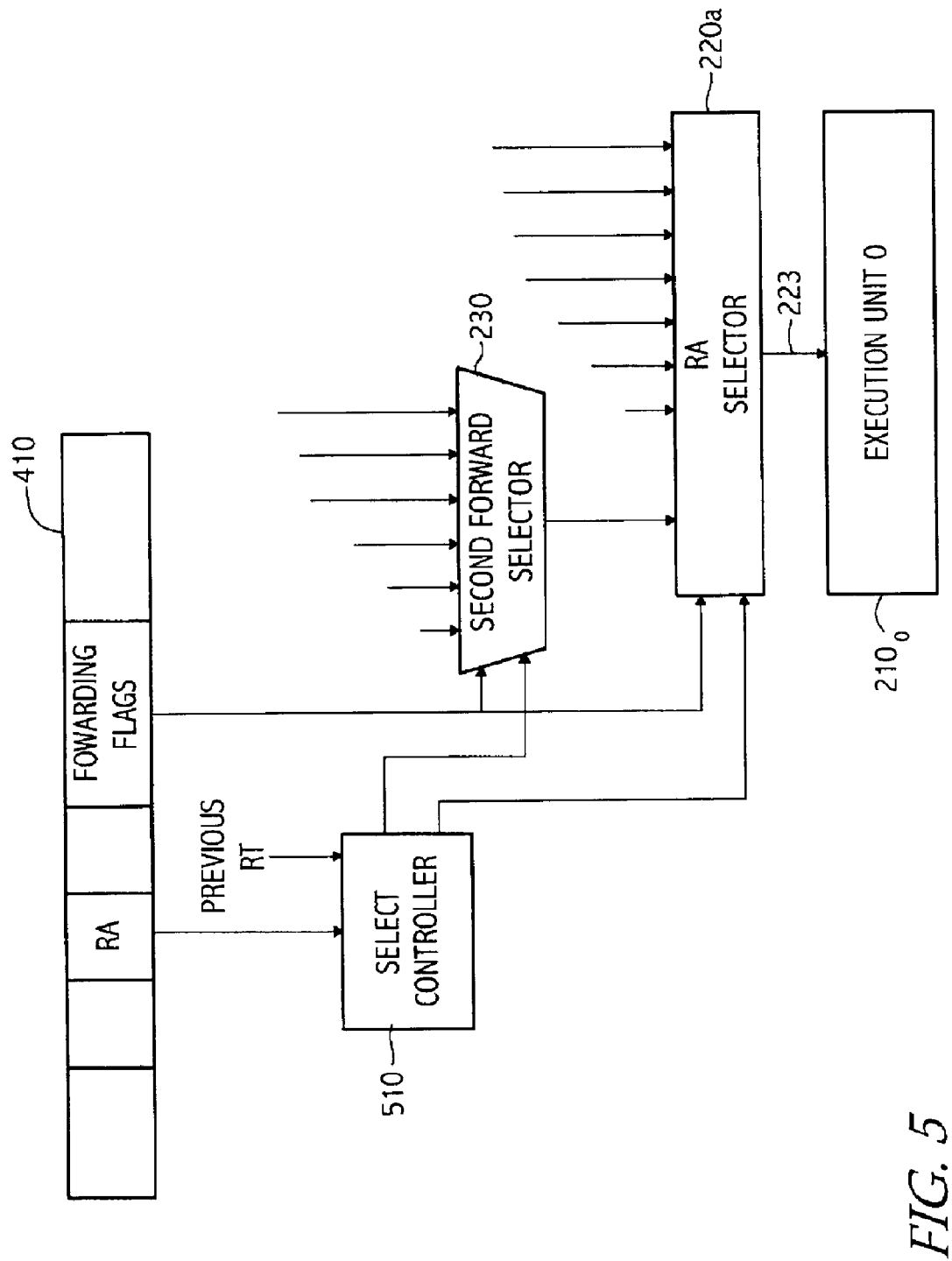
FIG. 5 shows yet another embodiment for implementing result forwarding for results coming to the execution unit $210_0$.

FIG. 5 shows another embodiment for implementing the selection of input signals coming to the second Forward Selector 230 and the RA Selector 220*a* of FIG. 4. In this embodiment, a Select Controller 510 is coupled to the second Forward Selector 230 and the RA Selector 220*a*. The Select Controller 510 receives as inputs and compares the RA field of the current instruction in the instruction register 410 and the RT field of a preceding instruction. If they are equal, result forwarding is possible. If so, the Select Controller 510 causes the RA Selector 220*a* to select the appropriate forwarded result to the execution unit 210*o*. The second Forward Selector 230 and the RA Selector 220*a* still receive forwarding flags from the instruction register 410. However, if the preceding instruction is a branch instruction, it may be impossible to determine a forwarding dependency between the current instruction and an instruction preceding the branch instruction. In this case, the Select Controller 510 is required.

In summary, the number of connection lines is reduced by implementing result forwarding for only one operand input (namely, the operand input coupled to the RA Selector 220*a* in the embodiments described above) for each execution unit in a processor. In one embodiment, if another operand input, for instance the one coupled to RB Selector 220*b*, needs result forwarding, the switch 330 swaps the RA and RB fields in the current instruction. As a result, both operand sources can follow two separate paths to the execution unit. In this manner, the number of connection lines is reduced to speed up the processor and reduce delays.

While the foregoing is directed to embodiments of the present invention, other and further embodiments of the invention may be devised without departing from the basic scope thereof, and the scope thereof is determined by the claims that follow.

What is claimed is:

1. A method for forwarding results of a first instruction to an execution unit having a first operand input and a second operand input, the method comprising:
  (a) loading a second instruction into an instruction register, the second instruction having first and second source register fields;
  (b) determining, with a forwarding controller, whether the first or second source register field specifies the results of the first instruction as an operand source of the second instruction;
  (c) if the first source register field specifies the results of the first instruction as an operand source of the second instruction, selecting a first source register corresponding to the second source register field and applying a content of the first source register to the second operand input of the execution unit, and
  if the second source register field specifies the results of the first instruction as an operand source of the second instruction, selecting a second source register corresponding to the first source register field and applying a content of the second source register to the second operand input of the execution unit; and
  (d) forwarding the results of the first instruction to the first operand input of the execution unit and not to the second operand input of the execution unit.

2. The method of claim 1, wherein the step of determining with a forwarding controller whether the first or second source register field specifies the results of the first instruction as an operand source of the second instruction comprises comparing, with the forwarding controller, a target register field of the first instruction and the first and second source register fields of the second instruction.

3. The method of claim 1, wherein the step (c) of claim 2 comprises:
  providing a switch configured to receive the first and second source register fields of the second instruction;
  providing a register file coupled to the switch via a first connection line and coupled to the second operand input of the execution unit via a second connection line; and if the first source register field specifies the results of the first instruction as an operand source of the second instruction, passing with the switch the second source register field to the register file via the first connection line to select the first source register in the register file and applying the content of the first source register to the second operand input of the execution unit via the second connection line, and if the second source register field specifies the results of the first instruction as en operand source of the second instruction, passing with the switch the first source register field to the register file via the first connection line to select the second source register in the register file and applying the content of the second source register to the second operand input of the execution unit via the second connection line.

4. The method of claim 3, further comprising:

providing a third connection line coupling the register file and the switch; and if the first source register field specifies the results of the first instruction as an operand source of the second instruction, passing with the switch the first source register field to the register file via the third connection line, and if the second source register field specifies the result of the first instruction as an operand source of the second instruction, passing with the switch the second source register field to the register file via the third connection line.

5. A method for forwarding results of a first instruction to an execution unit having a first operand input and a second operand input, the method comprising:

(a) loading the first instruction and a second instruction following the first instruction into a forwarding flag generator, the second instruction having first and second source register fields;

(b) determining, with the forwarding flag generator, whether the first or second source register field of the second instruction specifies the results of the first instruction as an operand source of the second instruction;

(c) if the first source register field specifies the results of the first instruction as an operand source of the second instruction, loading the second instruction into an instruction register, selecting a first source register corresponding to the second source register field, and applying a content of the first source register to the second operand input of the execution unit, and if the second source register field specifies the results of the first instruction as an operand source of the second instruction, replacing the content of the second source register field with that of the first source register field, loading the second instruction into an instruction register, selecting a second source register corresponding to the second source register field, and applying a content of the second source register to the second operand input of the execution unit; and (d) forwarding the results of the first instruction to the first operand input of the execution unit and not to the second operand input of the execution unit.

6. The method of claim 5, further comprising:

generating, with the forwarding flag generator, forwarding flags indicating whether the first or second source register field of the second instruction specifies the results of the first instruction as an operand source of the second instruction;

loading the forwarding flags into the instruction register along the second instruction; and passing the forwarding flags from the instruction register to the execution unit to select as inputs the results of the first instruction among a plurality of inputs from a plurality of execution units.

7. The method of claim 5, wherein the step of determining, with the forwarding flag generator, whether the first or second source register field specifies the results of the first instruction as an operand source of the second instruction comprises comparing, with the forwarding flag generator, a target register field of the first instruction and the first and second source register fields of the second instruction.

8. The method of claim 5, wherein the step of selecting the first or second source register corresponding to the second source register field comprises:

providing a register file configured to receive the second source register field of the second instruction in the instruction register via a first connection line; and passing the content of the second source register field to the register file via the first connection line to select the first or second source register.

9. The method of claim 8, further comprising:

providing a second connection line coupling the register file and the first source register field of the second instruction in the instruction register; and if the first source register field specifies the results of the first instruction as an operand source of the second instruction, passing the first source register field of the second instruction to the register file via the second connection line, and if the second source register field specifies the results of the first instruction as an operand source of the second instruction, replacing the content of the first source register field with that of the second source register field before loading the second instruction into the instruction register, and passing the first source register field of the second instruction to the register file via the second connection line.

10. A digital circuit, comprising:

an execution unit including first and second operand inputs wherein the first operand input is configured to receive forwarded results if a first instruction and the second operand input is configured not to receive the forwarded results of the first an instruction register configured to hold a second instruction having first and second source register fields;

a switch configured to receive the first and second source register fields of the second instruction;

a register file coupled to the switch and the second operand input of the execution unit via first and second connection lines, respectively; wherein if the first source register field specifies the forwarded results of the first instruction as an operand source of the second instruction, the switch passes the content of the second source register field to the register file via the first connection line to select a first source register and the register file passes a content of the first source register to the second operand input of the execution unit via the second connection;

if the second source register field specifies the forwarded results of the first instruction as an operand source of the second instruction, the switch passes the content of the first source register field to the register file via the first connection line to select a second source register and the register tile passes a content of the second source register to the second operand input of the execution unit via the second connection.

11. The digital circuit of claim 10, further comprising a third connection line coupling the switch and the register file wherein if the first source register field specifies the forwarded results of the first instruction as an operand source of the second instruction, the switch passes the content of the first source register field to the register file via the third connection line, and if the second source register field specifies the forwarded results of the first instruction as an operand source of the second instruction, the switch passes the content of the second source register field to the register file via the third connection line.

12. The digital circuit of claim 11, further comprising a forwarding controller configured to receive the first and second source register fields of the second instruction, determine if the first or second source register field of the second instruction specifies the forwarded results of the first instruction as an operand source of the second instruction, and cause the switch to pass one of the first and second source register fields to the register file via the first connection line.

13. The digital circuit of claim 12, wherein the forwarding controller is configured to compare the first and second source register fields of the second instruction and a target register field of the first instruction.

14. The digital circuit of claim 10, further comprising a forwarding controller configured to receive the first and second source register fields of the second instruction, determine lithe first or second source register field of the second instruction specifies the forwarded results of the first instruction as an operand source of the second instruction, and cause the switch to pass one of the first and second source register fields to the register file via the first connection line.

15. The digital circuit of claim 14, wherein the forwarding controller is configured to compare the first and second source register fields of the second instruction and a target register field of the first instruction.

16. A digital circuit, comprising:

an execution unit including first and second operand inputs wherein the first operand input is configured to receive forwarded results of a first instruction and the second operand input is configured not to receive die forwarded results of the first instruction;

a forwarding flag generator configured to receive the first instruction and a second instruction following the first instruction, the second instruction having first and second source register fields;

an instruction register coupled to the forwarding flag generator via a first connection line; and a register file coupled to the instruction register via a second connection line and to the second operand input of the execution unit via a third connection line; wherein the forwarding flag generator determines whether the first or second source register field of the second instruction specifies the forwarded results of the first instruction as an operand source of the second instruction, and if the first source register field of the second instruction specifies the forwarded results of the first instruction as an operand source of the second instruction, the forwarding flag generator sends the second instruction to the instruction register via the first connection line, the instruction register sends a content of the second source register field of the second instruction to the register file via the second connection line to select a first source register, and the register file sends a content of the first source register to the second operand input of the execution unit via the third connection line, and if the second source register field of the second instruction specifies the forwarded results of the first instruction as an operand source of the second instruction, the forwarding flag generator replaces the content of the second source register field of the second instruction with that of the first source register field, the forwarding flag generator sends the second instruction to the instruction register via the first connection line, the instruction register sends a content of the second source register field of the second instruction to the register file via the second connection line to select a second source register, and the register file sends a content of the second source register to the second operand input of the execution unit via the third connection line.

17. The digital circuit of claim 16, further comprising a fourth connection line coupling the instruction register and the register file, wherein if the first source register field of the second instruction specifies the forwarded results of the first instruction as an operand source of the second instruction, the instruction register sends a content of the first source register field to the register file via the fourth connection line, and if the second source register field of the second instruction specifies the forwarded results of the first instruction as an operand source of the second instruction, the forwarding flag generator replaces the content of the first source register field of the second instruction with an initial content of the second source register field before sending the second instruction to the instruction register via the first connection line, and the instruction register sends a content of the first source register field to the register file via the fourth connection line.

18. The digital circuit of claim 16, wherein the forwarding flag generator generate forwarding flags indicating whether the first or second source register field of the second instruction specifies the forwarded results of the first instruction as an operand source of the second instruction, the forwarding flag generator sends the forwarding flags along with the second instruction to the instruction register, and the instruction register sends the forwarding flags to the first operand input of the execution unit causing the first operand input to select the forwarded results of the first instruction among a plurality of forwarded results from a plurality of execution units.

* * * * *

UNITED STATES PATENT AND TRADEMARK OFFICE
CERTIFICATE OF CORRECTION

PATENT NO.     : 6,901,504 B2
DATED          : May 31, 2005
INVENTOR(S)    : David Arnold Luick It is certified that error appears in the above-identified patent and that said Letters Patent is hereby corrected as shown below:

Column 10,
Line 45, "if" should be -- of --.

Column 11,
Line 3, "title" should be -- file --.
Line 38, "lithe" should be -- if the --.
Line 53, "die" should be -- the --.

Signed and Sealed this

Second Day of August, 2005

JON W. DUDAS
*Director of the United States Patent and Trademark Office*